United States Patent Office 2,945,518
Patented July 19, 1960

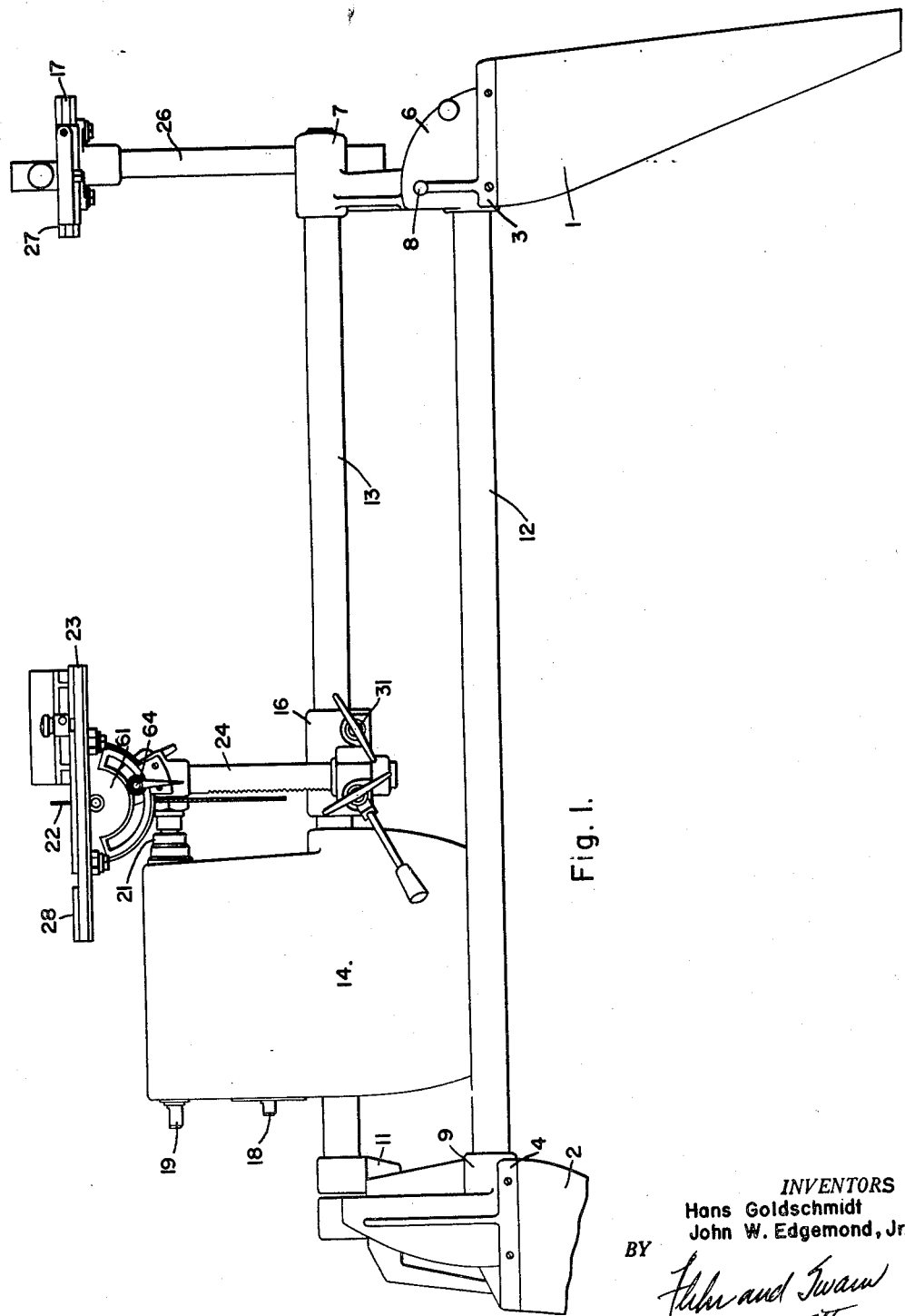

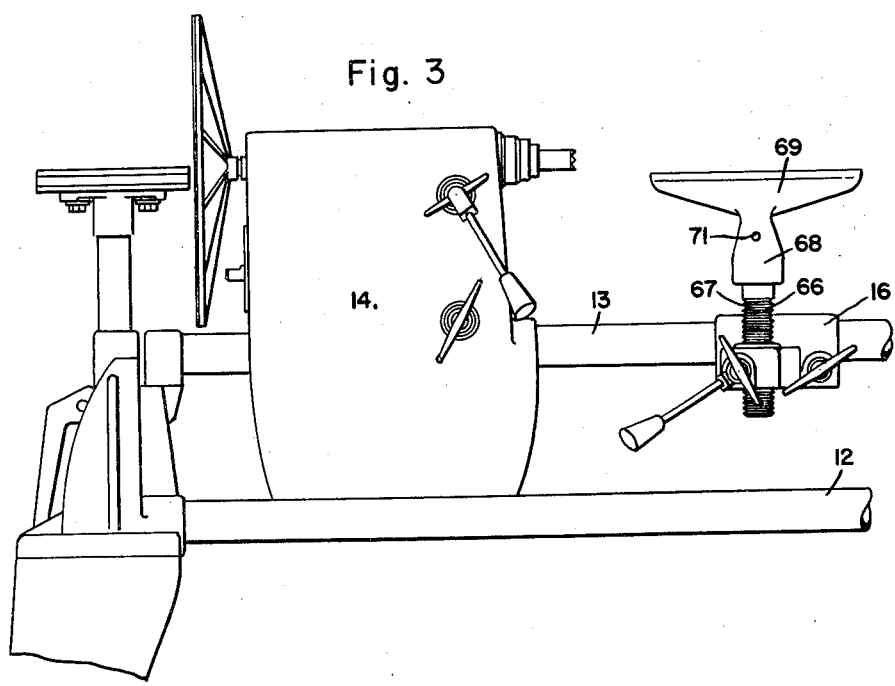
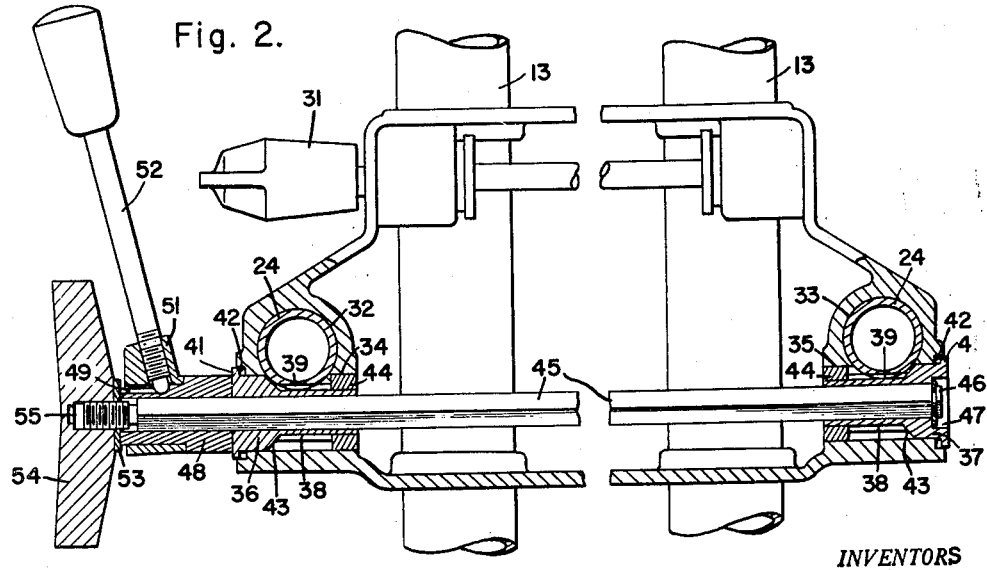

2,945,518

APPARATUS FOR RAISING AND LOWERING A SAW TABLE OR TOOL REST

John W. Edgemond, Jr., Los Altos, and Hans Goldschmidt, Atherton, Calif., assignors, by mesne assignments, to Yuba Consolidated Industries, Inc., San Francisco, Calif., a corporation of Delaware Original application Mar. 15, 1955, Ser. No. 494,468. Divided and this application Aug. 30, 1957, Ser. No. 681,390

3 Claims. (Cl. 143—132)

This invention relates to and in general has for its object the provision of a device for raising and lowering a saw table and this application is a division of our copending application Serial No. 494,468, filed March 15, 1955, for a "Combination Power Tool."

The objects and advantages of our above-identified patent application are fully set forth therein and this divisional application relates to the device for raising and lowering the saw table which is disclosed therein.

In that application our saw table and the device for raising and lowering the same is disclosed in combination with our combination tool but as is readily apparent from a study of our above-identified copending application, our saw table may be used in connection with any cutting member as, for example, a saw blade, a dado, or other similar apparatus separate and apart from the manner of use specifically disclosed in our above-identified application. It is a particular object of this invention however to provide a device for raising and lowering a saw table whereby the saw table may be raised or lowered by a single handle and whereby it may be locked in a predetermined selected position by operation of a second handle upon the same general mechanism or shaft to which the raising and lowering mechanism is secured and of which it is a part.

This invention possesses other advantageous features some of which, with the foregoing, will be set forth at length in the following description where that form of the invention which has been selected for illustration in the drawings accompanying and forming a part of the present specification is outlined in full. It is to be understood that our invention is not limited to such forms since the invention as set forth in the claims may be embodied in other forms.

Referring to the drawing:

Figure 1 is a front side elevation of a combination power tool illustrating our invention in combination therewith in the same manner as it is disclosed in the above identified application of which this is a division, Figure 2 is a transverse vertical section taken along the section line 2—2 of Figure 1 through the table and tool rest carriage and showing the carriage locking mechanism, and Figure 3 is a fragmentary front elevation of our invention showing the same when used as a tool rest support.

As is generally shown in Figure 1, our rip fence has been shown mounted on a combination tool of the type disclosed in copending application, Serial No. 494,468, filed March 15, 1955, for a "Combination Power Tool," of which application, the instant application is a division. The combination power tool disclosed therein includes a pair of opposed identical steel bench ends 1 and 2 which support a pair of bench base assemblies 3 and 4. The assemblies 3 and 4 differ in their construction; the bench base 3 consisting of portions 6 and 7 which are hingedly connected so that portion 7 may pivot about the point 8 and the bench base end 4 consisting of a pair of portions 9 and 11 which may be disconnected so that the portion 11 may be swung upwardly about point 8 and away from portion 9. The assemblies 3 and 4 accommodate two pairs of parallel transversally spaced longitudinally extending tubular ways 12 and 13. The pair of ways 13 accommodate a head stock assembly 14 and a table and tool rest carriage or mount 16. The portion 7 of the bench base assembly 3 supports an auxiliary table assembly 17 which may be raised and lowered with respect thereto.

The headstock 14 is adapted to be moved longitudinally along the ways 13 and generally comprises a suitable casting which supports an electric motor, not illustrated, which drives a plurality of driven shafts 18, 19 and 21 which are designed to accommodate a plurality of tools in the manner described in the aforementioned copending application.

As illustrated in Figure 1, a circular saw 22 is mounted on the shaft 21 and is adapted to be rotated thereby.

The table and tool rest carriage and mount illustrated generally at 16 is of rectangular form and is adapted to be slidably mounted upon the ways 13. The carriage supports a table which is mounted upon a pair of posts 24. The table 23 is conventional in shape and is provided with an elongated slot through which the blade 22 passes. The table assembly 17 is supported by a pair of tubular members 26 and is movable vertically so that its upper surface 27 may be made coplaner with the upper surface 28 of the table 23.

Associated with the carriage 16 is a carriage lock generally referred to by the reference numeral 31 by which the member 16 is locked or unlocked to prevent or permit movement thereof along the ways 13.

Formed in the carriage 31 outwardly of the ways 13 is a pair of parallel vertically extending sockets or bearings 32 and 33 arranged to slidably receive the table supporting posts 24 or, in the alternative, the socket 32 can slidably receive a tool rest post as indicated in Figure 3. Journaled in a pair of horizontal transversely extending bearings 34 and 35 formed in the carriage 16 in intersecting relationship with the bearings 32 and 33 are pinion barrels 36 and 37 provided with teeth 38 arranged to mesh with racks 39 formed on the posts 24.

Provided on the outer end of each of the pinion barrels 36 and 37 is a flange 41 receivable respectively in recesses 42 formed in the sockets or bearings 34 and 35 thereby to permit substantial lateral movement of the pinion barrels. Formed intermediate the ends of each of the pinion barrels are cone surfaces 43 arranged to wedgingly engage the straight surface of the posts 24 upon the inward movement of the pinion barrels 36 and 37. Fixed to the inner ends of the barrels are rings 44 journaled in the sockets or bearings 34 and 35. This lock will operate even though only one post (such as the post of a tool rest) is mounted on the carriage. Assuming that this post is the left hand post (Figure 2) it will be seen that although there is no post 24 in the other socket to limit the forward movement of barrel 36, its forward movement will nevertheless be arrested when the flange 41 is seated within the recess 42 of the bearing 34. A single post then can be locked and unlocked just as well as two posts.

Slidably extending through and keyed to barrels 36 and 37 is a square shaft 45 and fastened to the rear end (right-hand end as viewed in Figure 2) is a snap ring 46 receivable in a recess 47 formed in the outer end of the barrel 37. Keyed to the front end of shaft 45 is a sleeve 48 formed with a longitudinally extending slot 49 and journaled on the outer end of the sleeve 48 is a hub 51. Threaded in the hub 51 is an inclined control lever 52 arranged upon its inward travel to seat in the slot 49. By this expedient the hub 51 can be quickly and detachably keyed to the sleeve 48, thereby to rotate the shaft 45 and its associated pinion barrels 36 and 37, provided that these elements have not previously been locked against rotation.

Mounted over the threaded front end of the shaft 45 is a washer 53 and threaded to the shaft is a wing nut 54 formed with an internal axial recess 55 for permitting some substantial movement of the wing nut 54 on the shaft 45. To lock the posts 24 after they have been elevated to any desired position by the rotation of the lever 52, it is only necessary to turn the wing nut 54 in a clockwise direction for this causes the shaft 45 to pull the rear pinion barrel forwardly and to push the front pinion barrel rearwardly so as to bring the pinion cones 43 into simultaneous and uniform wedging relationship with the side walls of the posts. If desired, the lever 52 can be withdrawn from the slot 49 in which event it will swing freely on the sleeve 48.

Mounted on and across the upper ends of the posts 24 is a table mount yoke or bracket 61 (Figure 1) and pivoted thereto for swinging movement on a transverse horizontal axis is a work supporting table 23. Associated with the bracket 61 and table 23 is a locking mechanism generally referred to by the reference numeral 64 for locking the table in any desired degree of tilt in either direction (Figure 1).

The table 23 is provided with a slot through which the saw blade 12 passes. The table 23 may be raised or lowered with respect to the blade 12 depending upon the thickness of the workpiece or upon the depth of cut desired should the device be utilized in connection with a dado, for example. In the event the device is used as indicated in Figure 3, that is, to support a tool rest, the saw table as illustrated in Figure 1 and its tubular supports 24 may be removed from the sockets 34 and 35 and the tool post 66 can be slid into the socket 34. The tool rest illustrated in Figure 3 includes the tubular post 66 of a diameter equal to the diameter of the post 24. Provided on the post 66, entirely around its surface, is a rack 67 arranged to mesh with the pinion 36 regardless of the angular position of the post 66. Fixed to the upper end of the post is an arm 68 and swiveled in the upper end thereof is a tool rest head 69 arranged to be locked to the arm in any desired angular position by set screw 71. As a result of this construction the angular position of the head rest 69 relative to the work can be adjusted either by the set screw 71 or by bodily rotating the assembly about the axis of the post 66. Furthermore the entire assembly can be raised by the annular rack 67 without in any way disturbing its angular relation.

From the foregoing it is apparent that we have provided a table and tool rest carriage and mount which is not only slidable along the ways and adapted to be locked thereto against longitudinal movement but, we have provided such a mount which supports a table or tool rest in a manner whereby the same may be readily raised or lowered with respect to a tool or with respect to a headstock either to support a workpiece or a tool, and then locked in said predetermined position or elevation. The device may be readily and rapidly locked or unlocked in said predetermined position.

We claim:

1. A tool mount provided with a first pair of parallel transversely spaced bearings; a pair of posts, each of said posts being provided with a rack and slidably mounted in one of said bearings; a second pair of transversely spaced coaxial bearings formed in said tool mount in intersecting relationship with said first pair of bearings; a pinion drum journaled in each of said second pair of bearings, each of said drums being provided with a pinion arranged to mesh with the rack formed on its cooperating post and with a conical shoe, said conical shoes being disposed on opposite sides of the posts thereby locating the posts therebetween; a shaft slidably supported in said pinion drums and keyed thereto; means for rotating said shaft comprising a hub keyed thereto and slidably mounted thereon adjacent the outer end of one of said drums; means for operating said hub, and means for urging the conical shoes longitudinally along said shaft toward each other and into locking engagement with said posts comprising a nut threaded on said shaft adjacent said hub, and a stop means on the opposite end of said shaft adjacent the outer end of said other drum.

2. A tool mount provided with a first pair of parallel transversely spaced bearings; a pair of posts, each of said posts being provided with a rack and slidably mounted in one of said bearings; a second pair of transversely spaced coaxial bearings formed in said tool mount in intersecting relationship with said first pair of bearings; a pinion drum journaled in each of said second pair of bearings, each of said drums being provided with a pinion arranged to mesh with the rack formed on its cooperating post and with a conical shoe, said conical shoes being disposed on opposite sides of the posts thereby locating the posts therebetween, and with a flange, the flanges being disposed on the opposite ends of said drums from said shoes, thereby locating the shoes therebetween; a shaft slidably supported in said pinion drums and keyed thereto, means for rotating said shaft comprising a hub keyed thereto and slidably mounted thereon adjacent the outer end of one of said drums; means for operating said hub; and means for urging the conical shoes longitudinally along said shaft toward each other and into locking engagement with said posts comprising a nut threaded on said shaft adjacent said hub and a stop means on the opposite end of said shaft adjacent the outer end of said other drum.

3. A tool mount provided with a first pair of parallel transversely spaced bearings; a post slidably mounted in one of said bearings and provided with a rack; a second pair of transversely spaced coaxial bearings formed in said tool mount in intersecting relationship with said first of bearings; a pinion drum journaled in each of said second pair of bearings, each of said drums being provided with a pinion arranged to mesh with the rack of a post when said post is mounted in a selected intersecting bearing and with a conical shoe, said conical shoes being disposed on opposite sides of said parallel transversely spaced bearings thereby locating the same therebetween, and with a flange, the flanges being disposed on the opposite ends of said drums from said shoes thereby locating the shoes therebetween; a shaft slidably supported in said pinion drums and keyed thereto; means for rotating said shaft comprising a hub keyed thereto and slidably mounted thereon adjacent the outer end of one of said drums; means for operating said hub; and means for urging the conical shoes longitudinally along said shaft and toward each other and into locking engagement with said post comprising a nut threaded on said shaft adjacent said hub and a stop means on the opposite end of said shaft adjacent the outer end of said other drum.

References Cited in the file of this patent

UNITED STATES PATENTS

| | | |
|---|---|---|
| 158,747 | Shimer | Jan. 12, 1875 |
| 1,197,063 | Robinson | Sept. 5, 1916 |
| 1,329,390 | Josias | Jan. 6, 1920 |
| 1,855,939 | Collins | Apr. 26, 1932 |
| 2,370,351 | Hohwart | Feb. 27, 1945 |
| 2,623,269 | Goldschmidt | Dec. 30, 1952 |